(12) United States Patent
Yang

(10) Patent No.: US 6,642,633 B1
(45) Date of Patent: Nov. 4, 2003

(54) POWER MANAGEMENT ASSEMBLY

(75) Inventor: Shenghua Yang, Westland, MI (US)

(73) Assignee: Yazaki North America, Inc., Canton, MI (US)

(*) Notice: Subject to any disclaimer, the term of this patent is extended or adjusted under 35 U.S.C. 154(b) by 164 days.

(21) Appl. No.: 09/891,519

(22) Filed: Jun. 27, 2001

(51) Int. Cl.⁷ .............................................. H01B 11/02
(52) U.S. Cl. ..................... 307/147; 307/18; 307/9.1; 307/10.1; 307/10.6; 307/10.8
(58) Field of Search .................... 307/18, 9.1, 10.1, 307/10.6, 10.8, 48, 147

(56) References Cited

U.S. PATENT DOCUMENTS

| | | | | |
|---|---|---|---|---|
| 4,999,562 A | * | 3/1991 | Hill ................................. | 307/7 |
| 5,082,463 A | * | 1/1992 | Saimoto ...................... | 439/883 |
| 5,643,693 A | | 7/1997 | Hill et al. | |
| 5,645,448 A | | 7/1997 | Hill | |
| 5,666,040 A | * | 9/1997 | Bourbeau ....................... | 320/6 |
| 6,151,222 A | | 11/2000 | Barrett | |
| 6,152,776 A | | 11/2000 | Ikeda et al. | |
| 6,402,569 B1 | * | 6/2002 | Spadoni et al. ............. | 439/723 |
| 6,455,949 B1 | * | 9/2002 | Blauensteiner et al. .... | 307/10.1 |
| 6,459,170 B1 | * | 10/2002 | Tamai et al. .................. | 307/48 |
| 6,461,172 B2 | * | 10/2002 | Ross ............................. | 439/78 |
| 6,488,532 B2 | * | 12/2002 | Balzano ....................... | 439/504 |
| 2001/0004205 A1 | * | 6/2001 | Miller ........................ | 323/224 |

FOREIGN PATENT DOCUMENTS

JP        2000-245008        9/2000

* cited by examiner

Primary Examiner—Gregory J. Toatley, Jr.
Assistant Examiner—Robert L DeBeradinis
(74) Attorney, Agent, or Firm—Daniel R. Edelbrock

(57) ABSTRACT

A power management system comprises a busboard for selectively managing the power from a forty-two volt source and a fourteen volt source in a vehicle dual voltage electrical system. The busboard has a lower plate with recesses for receiving variously configured busbars. The busbars have upright terminals for electrical connection with the voltage sources. The power from the voltage sources is directed along the busbars to other terminals extending at assorted locations from the busboard. An upper cover fits over the lower plate and covers the recesses. The upper cover has an area accommodating the forty-two volt source and housings for partially enclosing the other terminals. One of the housings forms a forty-two volt jump start post. Another of the housings forms a fourteen volt jump start post. The terminal in the fourteen volt jump start post is connected through a DC/DC converter to the forty-two volt source so power from a vehicle having a fourteen volt electrical system can be converted to forty-two volts and used to charge the dual voltage system. A relay mounted on the busboard is actuated to provide power to a vehicle starter when the batteries are charged. An additional housing provides a connection port for electrically connecting the busboard to a vehicle alternator. Two further terminals on the busboard enable connection of forty-two volt power and fourteen volt power to a junction box requiring each of the separate voltages for serving different sets of electrical components.

20 Claims, 3 Drawing Sheets

POWER MANAGEMENT ASSEMBLY

BACKGROUND OF THE INVENTION

1. Field of the Invention

This invention is directed in general to an assembly or arrangement for managing power distribution in a dual voltage electrical system.

2. Discussion of Related Art

In the past, power management in automotive vehicles has been based on fourteen volt (14V) electrical distribution systems. The emergence of new technologies has increased the demand for electrical power. Electrical content of vehicles is steadily growing due to electrical components, such as electric brakes and steering, performing the functions of previously mechanical components, and due to the addition of information and entertainment networks. Problems have arisen because of the two-to-three kilowatt maximum power limitation of current 14V alternators. Within the industry, proposals have been made to increase the electrical system voltage to forty-two volts (42V). In this way, higher power output can be obtained from the alternator without dramatically increasing the output current. However, it is too costly to immediately switch or redesign all existing electrical components to those that can handle 42V. So a transition period is foreseen by the industry wherein vehicles employ a dual voltage system including both 14V and 42V power supplies. Vehicles can thereby continue to use some of the present components. This will reduce costs and technical difficulties associated with the switchover from 14V to 42V.

U.S. Pat. No. 6,151,222 illustrates a dual voltage automotive electrical system circuit. The invention concentrates on the design of a DC/DC converter to power low voltage loads at a fixed conversion ratio. The converter protects itself against overload conditions and minimizes switching loss. In U.S. Pat. No. 5,643,693, a power distribution module is mounted on the top surface of a battery to provide a compact, component-consolidated module. The disclosure of U.S. Pat. No. 6,152,776 is directed in part to a connecting plate having busbars that electrically connect multiple batteries. Cylindrical batteries are inserted into a holder. The connecting plates engage the battery electrodes protruding from the ends of the holder. These patents do not appear to address the need for complete, effective power management for a dual voltage electrical system.

SUMMARY OF THE INVENTION

Accordingly, it is an object of this invention to provide an assembly that efficiently manages selective power distribution in a dual voltage vehicle electrical system.

Another object of the invention is to enable jump start aid for a dual voltage system from vehicles having either a dual or forty-two volt system or vehicles having a fourteen volt system only.

A further object of this invention is to join main electrical system elements at a single location in a compact design.

In carrying out this invention in the illustrative embodiment thereof, a power management busboard comprises a plurality of variously configured busbars positioned on a lower plate. The busbars have flat and cylindrical terminals extending upward from the plate and eyelet terminals positioned at different levels relative to the plate. An upper cover fits over the plate and has housings that at least partially enclose some of the flat and cylindrical terminals. The cover has openings through which others of the terminals extend. The cover has an area for accommodating three fourteen volt batteries joined in series to form a forty-two volt source. Terminals from the forty-two volt source connect with terminals of the busboard, such that forty-two volt power is directed along some of the busbars. Other busbar terminals electrically connect with a separate, single fourteen volt battery such that fourteen volt power is directed along other busbars of the busboard.

A relay mounted on the busboard connects the forty-two volt source with a vehicle starter. Two of the cover housings form jump start aid posts. One of the jump start aid posts provides 42V jump start capability. The other jump start aid post furnishes conventional 14V jump start capability. The 14V power from an aid vehicle is routed through a DC/DC converter that sets atop the 42V source. The converter converts the 14V power to 42V power to charge the batteries. Another housing includes a connection port for electrically connecting the busboard to a vehicle alternator. A terminal extending from a busbar connected to a fourteen volt port of the converter and a terminal extending from a busbar connected to the forty-two volt source provide electrical connection to a fourteen volt bus and a forty-two volt bus, respectively, of a junction box. The junction box is then able to distribute power to vehicle components having different voltage requirements.

The busboard, batteries, converter and junction box are secured within a power hub case with a lid having doors providing access to the jump start aid posts. The case is compact because of the way the elements fit together, and positions all the elements in a single location. The busboard straightforwardly supports and interfaces with the batteries, power relay and junction box. The provisions of fourteen volt jump aid and forty-two volt jump aid give jump start ability to a vehicle in case of drained batteries, regardless of the type of electrical system in the aiding vehicle. Snap-in interfaces between the busboard plate and cover, simple terminal insertion connection with batteries, and direct interfaces with the junction box provide easy and quick assembly.

BRIEF DESCRIPTION OF THE DRAWING

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
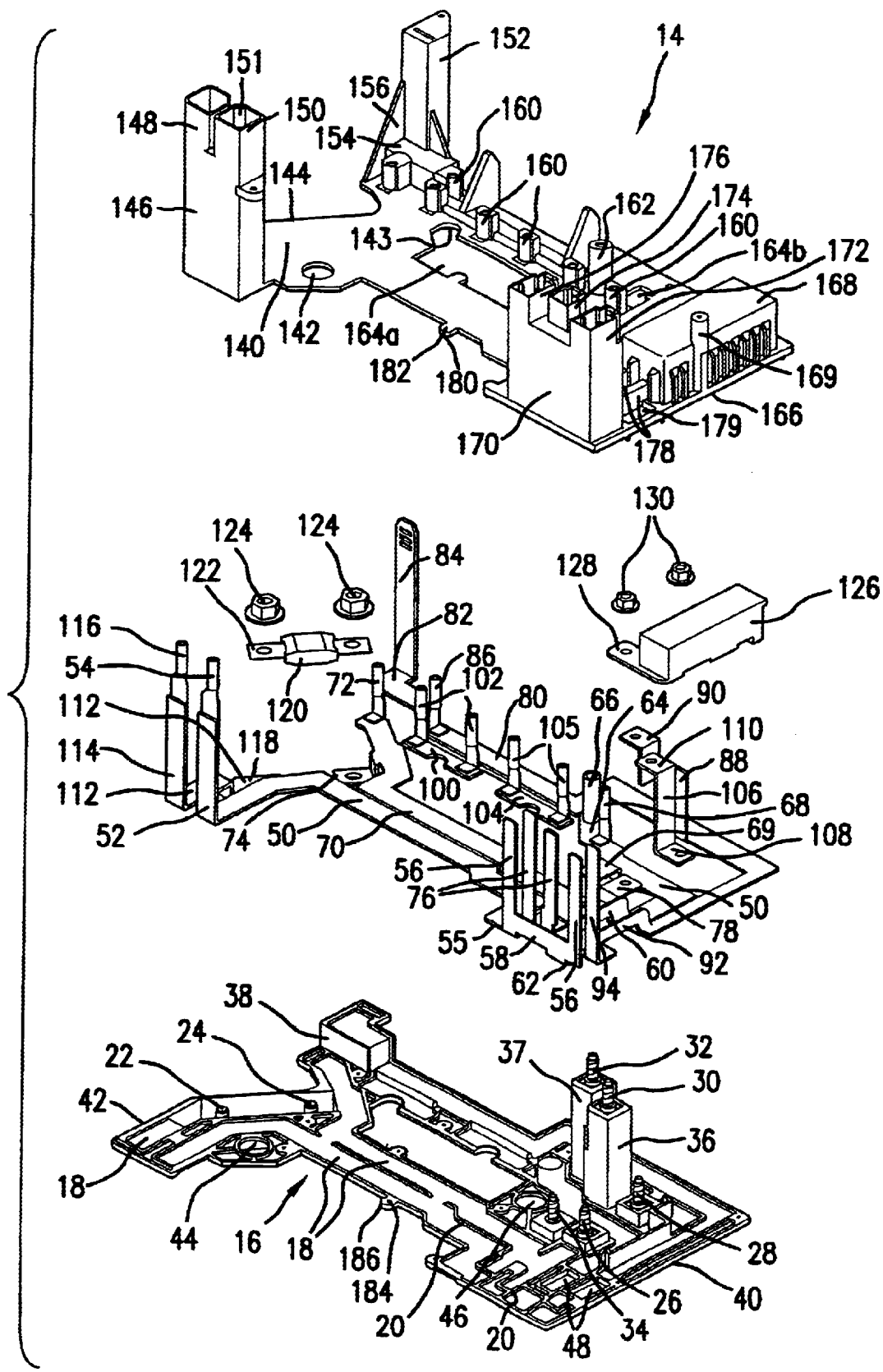
FIG. 1 is an exploded perspective view showing individual layers of a power management busboard according to the present invention.
Figure 3:
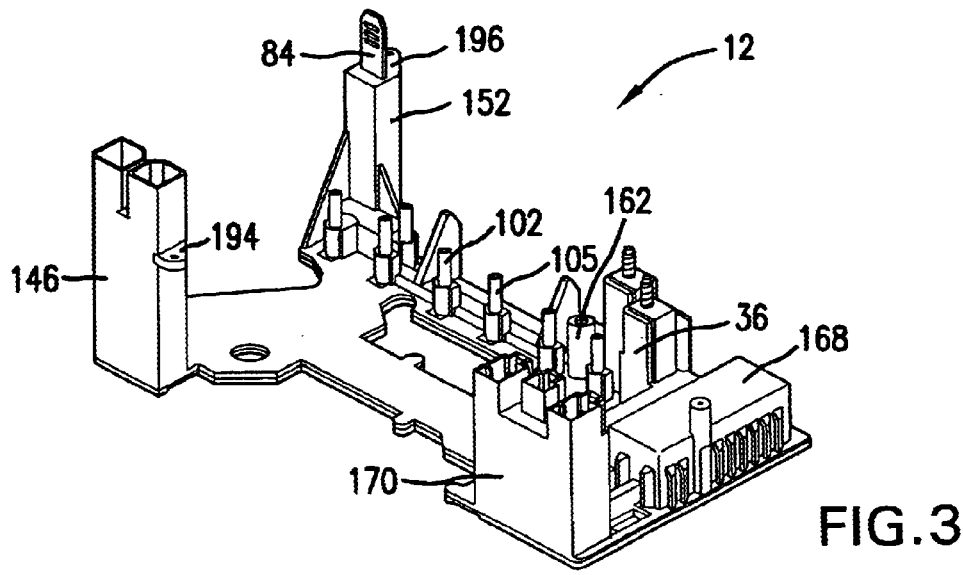
FIG. 3 is perspective view of an assembled power management busboard.

Referring now to FIGS. 1 and 3, a power management busboard 12 according to the present invention has an upper cover 14 and a bottom plate 16 made from an electrically non-conductive material. The plate 16 is molded with multiple recesses 18 for receiving individual busbars that will be sandwiched at least partially if not completely between the lower and upper covers. Adjacent recesses are separated by traces 20 molded between them. Stud bolts 22–34 are secured to the plate in various locations by conventional manner. The bolts may alternatively be injection-molded into the plate. Two adjacent columns 36 and 37 and a short block 38 are formed to extend upward from the plate. The columns 36 and 37 are near a first end 40 of the plate and the block 38 is at an opposite, second end 42. Two of the stud bolts 30 and 32 extend upward from the columns. Spaced apart locating holes 44, 45 and 46 extend through the plate. Openings 48 are for air flow through the plate 16.

Figure 2:
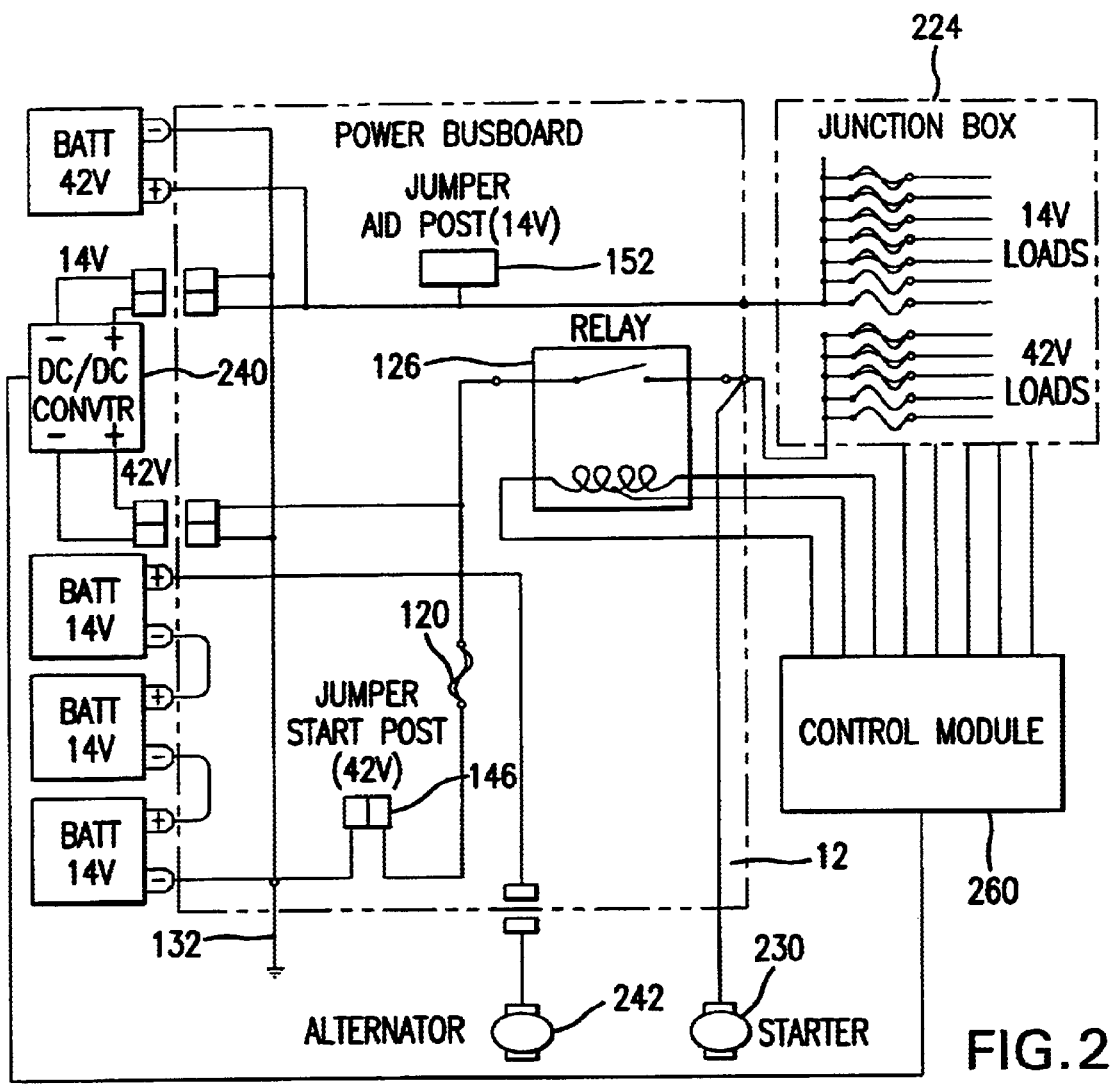
FIG. 2 is a circuit diagram for a power management system according to the present invention.

The busbars are designed and configured based on the electrical system circuitry illustrated in FIG. 2. They are stamped, formed and assembled as necessary from an electrically conductive metal. Some of the busbars have integral, upright flat male terminal. Others have male pin or cylindrical terminals and one has a female cylindrical terminal. The cylindrical terminals are attached to the busbars by, for example, welding. Still other busbars have stamped eyelet terminals that are basically flanges with apertures through them. All terminals can be made integral with the busbars if cost concerns are not important.

Busbar 50 has an upright section 52 at a first end with an attached male cylindrical terminal 54. An intermediate section 55 of busbar 50 has two spaced, upstanding, integral flat male terminals 56. The terminals 56 are spaced by a raised arm 58 that allows the busbar to cross over insulating traces 20. A trace cross-over piece 60 is connected by an L-shaped appendage 62 to the raised arm 58. The cross-over piece 60 connects the rest of busbar 50 with the intermediate section 55. A second end 64 of the busbar 50 has an upright female cylindrical terminal 66. A male cylindrical terminal 68 is spaced from the female cylindrical terminal a short distance along the busbar from the second end 64. A raised eyelet terminal 69 is positioned approximately mid-way along the busbar between second end 64 and intermediate section 55.

Busbar 70 has a cylindrical male terminal 72 at a first end and a lowered stamped eyelet terminal 74 spaced a short distance along the busbar 70 from the male cylindrical terminal 72. A second end of the busbar 70 has two, side-by-side, upstanding, integral flat male terminals 76 for positioning adjacent the terminals 56 and an oppositely extending raised eyelet terminal 78 for eventual placement adjacent the eyelet terminal 69. The busbars 50 and 70 would be positioned close to each other.

Busbar 80 has a first end with a raised extension 82. A tall, flat male terminal 84 extends upward from the raised extension. The raised extension 82 would be supported by the short block 38 of the plate 16 when the busbar 80 is laid on the plate. An upright cylindrical male terminal 86 is closely spaced from the extension. A second, higher, raised extension 88 further along the busbar 80 supports an offset stamped eyelet terminal 90. At a second end of the busbar 80, a trace cross-over piece 92 would position an upright flat male terminal 94 adjacent the terminals 56 and 76.

Shorter busbar 100 has an upright male cylindrical terminal 102 extending from each of its ends. Identical busbar 104 has upright male cylindrical terminals 105 extending from each of its ends. The bus bars 100 and 104 would be positioned along part of the busbar 80 when laid in the plate 16. A vertical busbar 106 has a stamped, horizontal eyelet terminal 108 at its low end and a horizontal eyelet terminal 110 at its high end. The busbar 106 would be positioned adjacent the raised extension 88 and eyelet terminal 90 of the busbar 80. A busbar 112 would be positioned adjacent the first end of busbar 50 and have an upright section 114 with a male cylindrical terminal 116 adjacent the terminal 54. An eyelet terminal 118 (only partially shown) is located at an opposite, lower end of the busbar 112.

The busbars are laid on the plate in the recesses 18. Adjacent busbars are electrically insulated from each other by the traces 20. A fuse 120 with eyelet terminals 122 at each end is connected to the eyelet terminal 118 of the busbar 112 and the eyelet terminal 74 of the busbar 70 by the stud bolts 22 and 24 and the nuts 124. A power relay 126 with eyelet terminals 128 at each end is connected between eyelet terminal 78 of busbar 70 and lower eyelet terminal 108 of busbar 106 by stud bolts 26 and 28 and nuts 130. The upper eyelet 110 of busbar 106 fits around the stud bolt 30 of the column 36. The raised eyelet terminal 90 of the busbar 80 fits around the stud bolt 32 of the other column 37. The eyelet terminal 69 of the busbar 50 slides around the stud bolt 34. An additional eyelet terminal (not shown) on the end of a grounding wire would fit around the stud bolt 34 and be secured by a nut (not shown) to the busboard in connection with the terminal 69. The ground connection is illustrated at reference number 132 in FIG. 2.

The upper cover 14 has a flat base 140 for sandwiching the horizontal main portions of the busbars 50, 70 and 80 between the cover and plate. Locating holes 142, 143 (only some are shown) in the base 140 line up with the locating holes 44, 45 and 46 of the plate. A first end 144 of the upper cover has an upright hollow jump start housing 146 with a section 148 for receiving the male cylindrical terminal 116 of the busbar 112 and a section 150 for receiving the male cylindrical terminal 54 at the first end of the busbar 50. The sections 148 and 150 are shaped or angled as at 151 to provide a polarization feature so a distinctive 42V jump cable connector can only be connected in the correct way, avoiding a potentially dangerous reverse connection. Across the first end 144 of the upper cover, a second hollow jump start housing 152 receives the flat male terminal 84 of the busbar 80. The jump start housing 152 has a widened pedestal portion 154 for fitting over the raised extension 82 of the busbar 80 and the short block 38 of the plate 16, and is stiffened by braces 156.

Hollow, partially cylindrical projections 160 extend upward from the base 140 along its length. These projections 160 are positioned and are short enough to enable the cylindrical male terminals of the busbars 50, 70, 80, 100 and 104 to pass through the base and protrude from the projections as illustrated in FIG. 3. A taller tube-like projection 162 extending upward from the base is positioned and is tall enough to completely receive the female cylindrical terminal 66 of the busbar 50.

An elongated opening 164a extends along the base. An opening 164b in the base allows the columns 36 and 37 of the plate 16 to pass through the upper cover 14. A second end 166 of the cover base 140 has a relay housing 168 for fitting over the power relay 126. A post 169 with a hole in its upper end extends upward from an outer edge of the relay housing 168. A terminal housing 170 extends upward from the base 140 on one side of second end 166. The terminal housing is topped by three connection ports 172, 174 and 176. The connector port 172 enables access to one of the flat male terminals 56 of busbar 50 and flat male terminal 94 of busbar 80. Smaller, center connector port 174 allows access to one of the flat male terminals 76 of busbar 70. Connector port 176 enables access to the other flat male terminal 56 of busbar 50 and the other flat male terminal 76 of busbar 70.

Smaller slot housings 178 fit over the cross-over pieces 60 and 92 of busbars 50 and 80, respectively. Air flow openings 179 (only one is shown) line up with openings 48 in the plate 16 to allow air flow through the busboard. When the upper cover 14 and plate 16 are assembled around the busbars, as shown in FIG. 3, various connection pins 180 extending downward from tabs 182 spaced around and within the upper cover are snapped into sockets 184 in corresponding tabs 186 spaced about the plate. The pins are then heat-melted to secure the assembly together.

Figure 4:
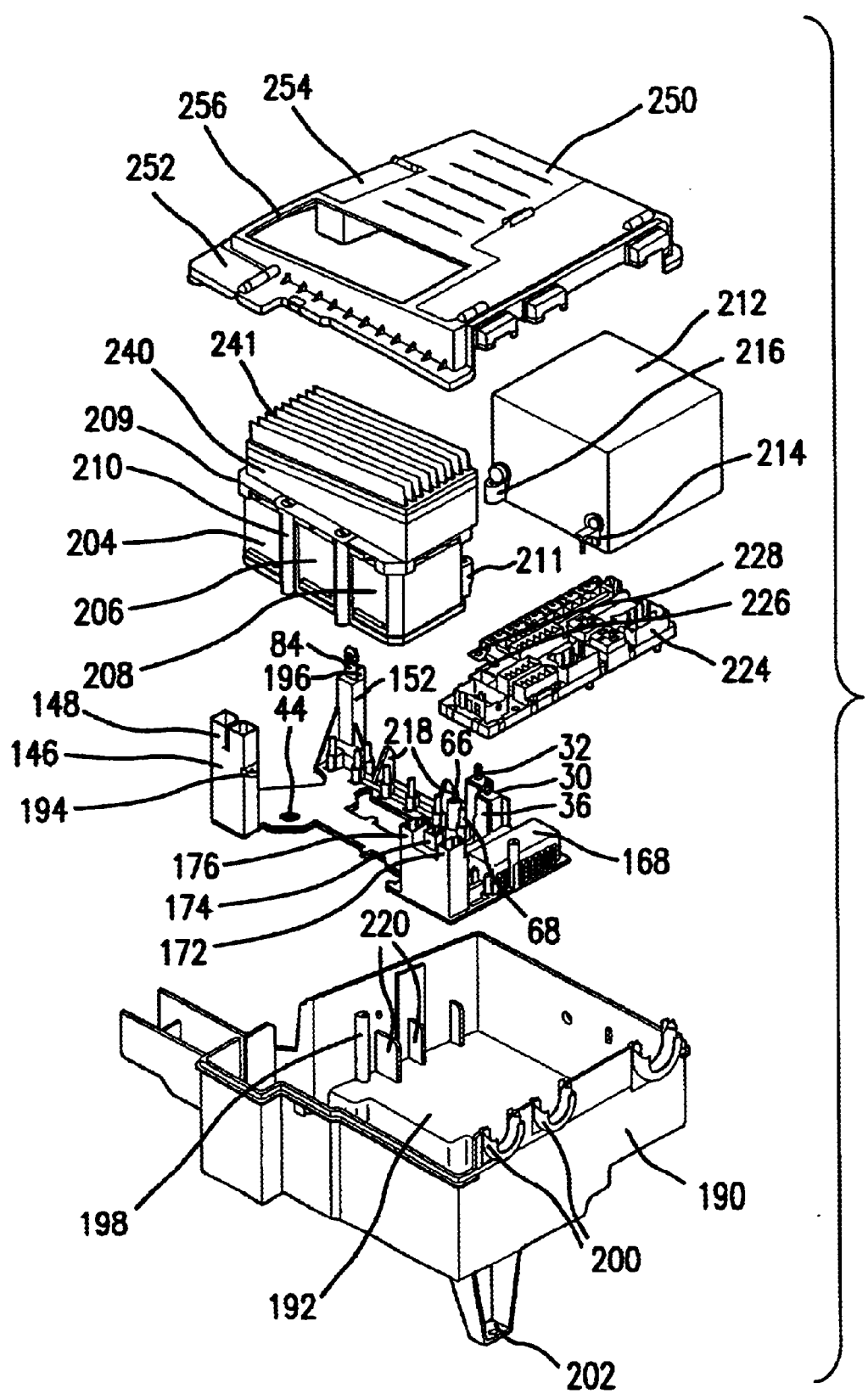
FIG. 4 is an exploded perspective view of a power hub incorporating the busboard with other components.

FIG. 4 illustrates the power busboard's place in the power hub assembly. The busboard sets within a hub case 190 on a bottom wall 192 of the case. The locating holes 44, 45 and 46 are matched with bosses (hidden from view) on the bottom wall to properly position the busboard. Tap screws (not shown) would extend through support bracket 194 on the jump start housing 146 and support bracket 196 on the second jump start housing 152 into holes in posts 198 (only one is shown) extending upward from the bottom wall 192 of the case. The jump start housings are thereby prevented from moving. The passages through the busboard formed by the openings 48 in the plate 16 and the aligned openings 179 in the cover 14 allow air flow through the hub case for cooling purposes. The hub case 190 has spaced circular slots 200 to enable wire harnesses to be guided into the case and brackets such as the one shown at 202 to fix the case within the engine compartment of a vehicle.

Three 14V start batteries 204, 206 and 208 are accommodated by the open area on top of the base 140 of the upper cover 14 of the busboard. A frame 209 with screw posts 210 clamps the batteries to the hub case. The batteries have cavities (not shown) in their lower surfaces for receiving the bosses on the bottom wall 192 of the case 190 that extend up through the locating holes 44, 45, 46, and 142 in the power busboard. This properly positions and supports the batteries above the busboard in the accommodating area of the cover. Each 14V battery has two female terminals 211 (only one is shown because of the view angle of the drawing). The batteries are lowered onto the bosses and the terminals on the busboard. The female terminals of 14V battery 204 would receive the pin or cylindrical male terminal 72 of busbar 70 and one of the male terminals 102 of busbar 100. The female terminals of 14V battery 206 receive the other male terminal 102 of busbar 100 and one of the male terminals 105 of busbar 104. The female terminals of 14V battery 208 receive the other male terminal 105 of busbar 104 and the male terminal 68 of busbar 50. The start batteries are thereby connected in series to form the system's 42V power source or storage.

A 14V reserve battery 212 having a male terminal 214 and a female terminal 216 sets on the bottom wall 192 of the case 190 across from the start batteries. The male terminal 214 is coupled with the female cylindrical terminal 66 of busbar 50 and the female terminal 216 receives the male cylindrical terminal 86 of busbar 80. This provides a 14V power source or storage. Spacers 218 extending from the base 140 of the upper cover 14 separate the 14V reserve battery from the batteries forming the 42V power source and help guide the reserve battery into position. Spacers 220 within the hub case also help guide and position the 14V reserve battery in the hub case.

A junction box 224 has a 42V bus 226 for connection to the stud bolt 30 of the column 36 and a 14V bus 228 for connection to the stud bolt 32 of column 37. A junction box is commonly used in automotive vehicles to streamline electrical system wiring by eliminating multi-branch wiring. The center consolidates fuses, branch circuits, relays and other electrical components in a single location. This is typically done by incorporating multiple busbars into a housing according to each individual electrical circuit. The housing often includes a plurality of receptacles for receiving electrical connectors, fuses, relays and other circuit components. The busbars have a plurality of blade-like extensions that project into some or all of the receptacles to make electrical contact with the components. The busbar is used to supply electrical power to the components for serving the vehicle electrical systems. The 14V bus 228 would serve those vehicle systems that require the lower voltage. The 42V bus 226 would serve those electrical systems that require higher voltage. A bolt or tap screw (not shown) extending through the junction box would be received into the post 169 on the end 166 of the busboard cover 14 to secure the junction box in position. Another post (not shown), the bolt connections with columns 36 and 37, and some supports inside the hub case provide a stable mount for the junction box.

Stud bolt 32 on column 37 and eyelet terminal 90 of busbar 80 are mated to provide connection to the junction box 14V bus 228. Eyelet terminal 110 of busbar 106 slides over stud bolt 30 on column 36 to provide connection to the 42V bus 226 of junction box 224. A cable (not shown) with an eyelet terminal on its end would also be connected to the stud bolt 30 on column 36 to provide 42V power to the vehicle starter 230 (FIG. 2). Nuts (not shown) are then tightened on the stud bolts 30 and 32 to secure the connections.

A dual directional DC/DC converter 240 is bolted down atop the 42V battery combination. A finned heat sink 241 is on the top side of the converter to prevent the converter from overheating. A first connector (not shown) from the converter engages the flat male terminals 56 and 94 in connection port 172, electrically connecting these terminals to a 14V port of the converter. A second connector (not shown) from the converter engages the flat male terminals 56 and 76 in connector port 176, connecting these terminals to a 42V port of the converter. Connection port 174 with inner flat male terminal 76 is a power input from the vehicle's alternator 242 (FIG. 2).

A hub case lid 250 fits over the case 190 to enclose the converter, battery combination, reserve battery, junction box and power busboard. Hinged doors 252 and 254 on the hub case lid give access to the jump start housings 146 and 152, respectively. The hub case cover has an opening 256 for fitting around the top of the converter 240 and venting the heat sink 241.

With this assembly or system, the jump start housing 146 becomes a 42V jump aid connection and the jump start housing 152 becomes a 14V jump aid connection. In case of a dead battery disabling a vehicle having the power busboard of this invention, a distinctive 42V jumper cable would be directed from a running vehicle having 42V power through hinged door 252 to 42V jump start housing 146. If the running vehicle has only a 14V electrical system, then the jumper cable from the running vehicle would be directed through access door 254 to jump start housing 152. In this second situation, the 14V electrical current provided by the running vehicle first goes through DC/DC converter 240 to be converted to 42V electrical current. Then the current charges the start batteries 204, 206 and 208. Once enough energy is stored in the batteries, a battery control module 260 (FIG. 2) integrated with the junction box 224 gives a signal powering the relay 126 to allow the disabled vehicle to be started. The fuse 120 prevents current overload from damaging the system.

Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A power management assembly comprising:
   a first power source for supplying power at a first voltage and a second power source for providing power at a second, higher voltage;
   a junction box for distributing power to a first set of electrical components and a second set of electrical components;
   a busboard for electrically connecting the junction box to the first power source for providing power at the first voltage to the first set of electrical components and electrically connecting the junction box to the second power source for providing power at the second voltage to the second set of electrical components, the busboard comprising a plurality of busbars mounted on a single plate, the busbars having terminals through which the first and second power sources and the junction box are directly, electrically connected to the busboard; and
   means for supporting the first power source, second power source and junction box on the busboard to provide a compact assembly.

2. The power management assembly of claim 1 wherein each busbar receives power from the first or second power source at the first or second voltage and directs the power to at least one output terminal.

3. The power management assembly of claim 2 wherein the junction box has a first bus for distributing power to the first set of electrical components and a second bus for distributing power to the second set of electrical components, the first bus being electrically connected to a terminal of the busboard busbar to which the first voltage has been directed and the second bus being electrically connected to a terminal of the busboard busbar to which the second voltage has been directed.

4. The power management assembly of claim 1 wherein a DC/DC converter is mounted on the second power source and is electrically connected to the first and second power sources through the busboard to connect the first and second voltages to the junction box.

5. The power management assembly of claim 1 wherein the second power source comprises three batteries electrically connected together in series through the busboard.

6. The power management assembly of claim 5 wherein the first power source comprises a fourth, separate battery electrically connected to the busboard.

7. The power management assembly of claim 1 wherein the busboard further comprises a pair of terminals, one of the terminals of the pair being electrically connected with the second voltage and the other of the terminals of the pair adapted to be electrically connected with a vehicle starter.

8. The power management assembly of claim 1 further comprising a jump start housing directly extending from the busboard and allowing access to a terminal of a busbar electrically connected to the first voltage source and a second terminal adapted to be electrically connected to a vehicle starter.

9. A power management assembly comprising:
   means for supplying power at a first voltage and a second, higher voltage;
   a junction box for distributing power to a first set of electrical components and a second set of electrical components;
   a busboard for electrically connecting the junction box to the power supply means for providing power at the first voltage to the first set of electrical components and providing power at the second voltage to the second set of electrical components, the junction box and power supply means being supported on the busboard, the busboard having a section for housing a jump start terminal extending from the busboard, the busboard further including a pair of terminals, one of the terminals of the pair being electrically connected with the second voltage and the other of the terminals of the pair adapted to be electrically connected with a vehicle starter; and
   a DC/DC converter supported on the power supply means and electrically connected between the jump start terminal of the busboard and the power supply means, wherein lower voltage provided to the jump start terminal is converted to the second, higher voltage to charge the power supply means.

10. The power management assembly of claim 9 further comprising a case for enclosing the busboard, junction box, power supply means and DC/DC converter, whereby the entire assembly system is compact and positionable in a single location.

11. The power management assembly of claim 9 further comprising a control module connected to a relay, the relay mounted on the busboard in electrical connection with the power supply means and adapted to be electrically connected with a vehicle starter, the control module being connected to the converter and operable to actuate the relay to power the starter when enough energy is stored in the power supply means.

12. The power management assembly of claim 9 wherein the busboard has connection means adapted for electrically connecting the power supply means with a vehicle alternator.

13. The power management assembly of claim 12 wherein the DC/DC converter is also electrically connected between the alternator connection means and the power supply means.

14. A busboard providing power management for a dual voltage electrical system, the busboard comprising:
   an electrically non-conductive bottom plate having recesses;
   a plurality of busbars for being laid into the recesses of the plate;
   terminals attached to the busbars, each terminal extending at an angle from the busbars for direct electrical connection to first and second voltage sources of the dual voltage electrical system;
   an upper cover for covering the recesses, the upper cover having an area for accommodating the first voltage source of the dual voltage electrical system immediately adjacent the busboard as it electrically engages some of the busbar terminals; and
   a jump start housing extending from the upper cover and allowing access to a terminal of a busbar electrically connected to the first voltage source and a second terminal adapted to be electrically connected to a vehicle starter.

15. The busboard of claim 14 further comprising a relay mounted on the busboard, the relay having a first side electrically connected to a terminal of a busbar electrically engaged with the first voltage source and a second side adapted to be electrically connected with a vehicle starter.

16. The busboard of claim 14 wherein the jump start housing is configured to permit access to the terminals by a jump start connector in only one orientation, whereby incorrect connection is prevented.

17. The busboard of claim 14 further comprising a DC/DC converter electrically connected to the dual voltage electrical system through the busboard.

18. The busboard of claim 17 further comprising a second jump start housing extending from the upper cover and allowing access to a terminal electrically connected through the DC/DC converter to the dual voltage electrical system.

19. The busboard of claim 14 wherein one of the plurality of busbars has a terminal for electrically connecting the first voltage source with a junction box attached to the busboard, and another of the plurality of busbars has a terminal for electrically connecting a second voltage source of the dual voltage electrical system with the junction box.

20. The busboard of claim 14 wherein the first voltage source comprises multiple batteries connected in series by the positions of the engaging terminals.

* * * * *